T. DITMARS.
DRIVING MECHANISM.
APPLICATION FILED APR. 26, 1915.
1,199,163.
Patented Sept. 26, 1916.
2 SHEETS—SHEET 1.
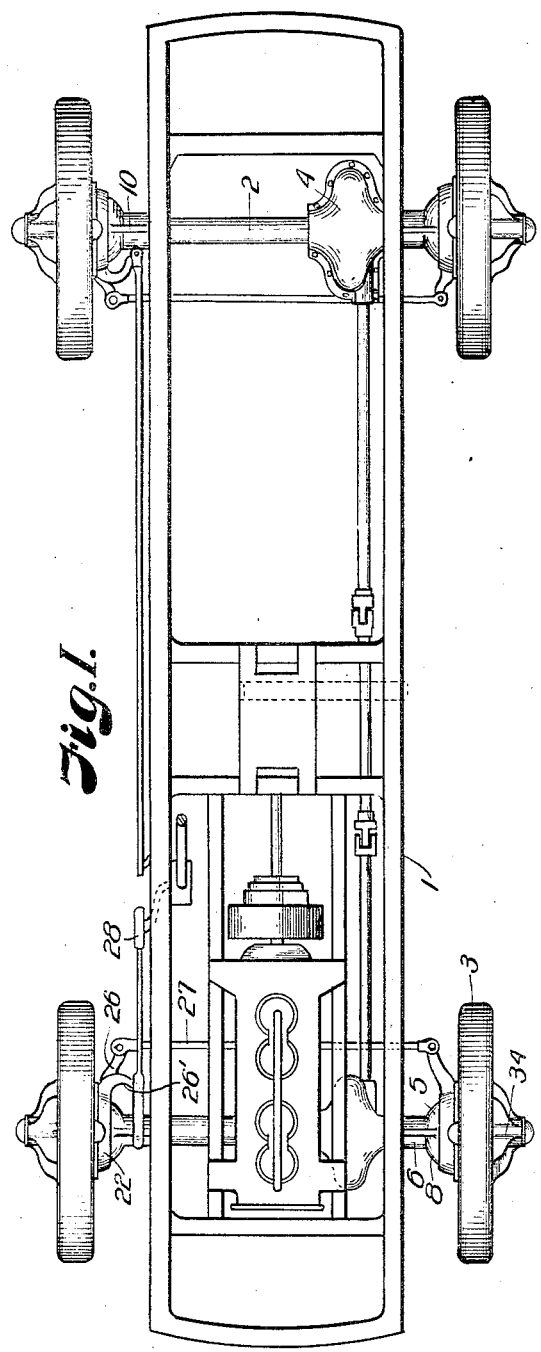
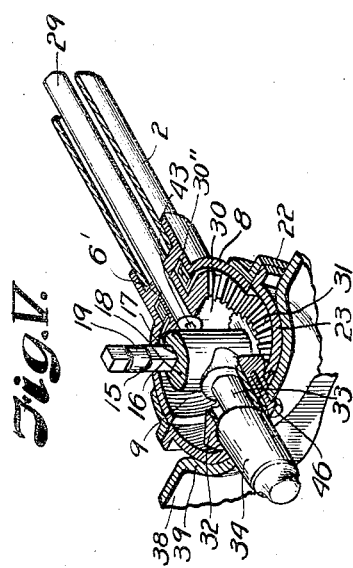
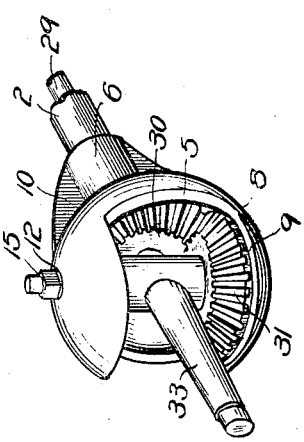
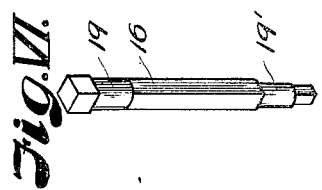
INVENTOR
*Theodore Ditmars.*
BY
*Arthur C. Brown,*
ATTORNEY

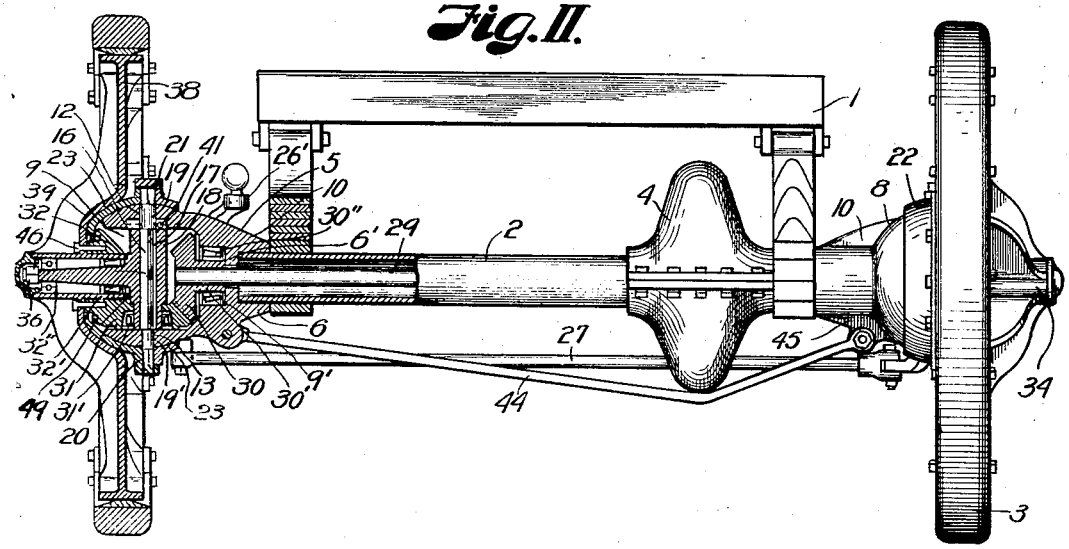
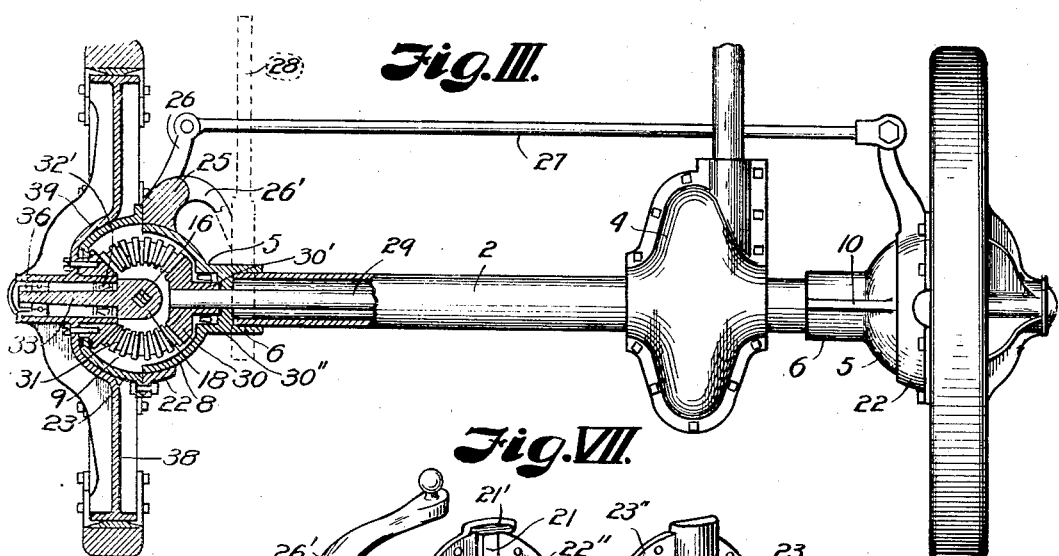
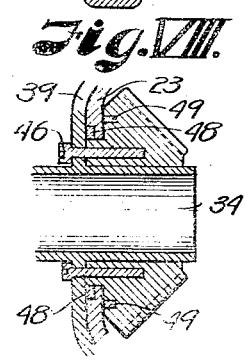

UNITED STATES PATENT OFFICE.

THEODORE DITMARS, OF KANSAS CITY, MISSOURI.

DRIVING MECHANISM.

1,199,163.  Specification of Letters Patent.  Patented Sept. 26, 1916.

Application filed April 26, 1915. Serial No. 23,989.

*To all whom it may concern:*

Be it known that I, THEODORE DITMARS, a citizen of the United States, residing at Kansas City, in the county of Jackson and State of Missouri, have invented certain new and useful Improvements in Driving Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to driving mechanism for motor driven vehicles, and has for its principal object to provide means for driving each wheel of the vehicle independently of the others in order to apply power directly to the individual wheels.

It is also an object of the invention to provide a driving mechanism of this character which is so arranged in relation to the wheel and driving shaft that it will not interfere with the steering of the vehicle.

In accomplishing these and other objects of the invention I have provided improved details of structure, the preferred forms of which are illustrated in the accompanying drawings, wherein:—

Figure I is a plan view of the frame and running gear of a motor driven vehicle equipped with my improvements. Fig. II is an end view of a pair of ground wheels with their supporting and connecting parts, showing the driving mechanism for one of the wheels in longitudinal section. Fig. III is a plan view of the same with the driving mechanism in horizontal section. Fig. IV is an enlarged detail perspective of one of the wheel spindles with its mounting, and showing the transmission gears for an individual wheel. Fig. V is a perspective section of one of the driving units. Fig. VI is a detail perspective of one of the steering pins. Fig. VII is an enlarged detail perspective of the housing ring for an individual gear. Fig. VIII is a sectional view of a part of the wheel hub and gear mounted thereon, particularly illustrating the inserted washers.

Referring more in detail to the drawings:—1 designates the frame, 2 the axle and 3 ground wheels of a motor driven vehicle; the axle being hollow and provided with a differential gearing which is indicated by the casing 4.

Fixed to each end of the shaft is a yoke or housing 5 having a collar 6 attached to the end of the hollow shaft and stiffened by webs 10, and a ball 8, the side of which opposite the collar is cut away to form a socket 9 within which the individual wheel gearing is contained. The top and bottom portions of the ball 8 are provided with round apertures 12—13 of different diameter, and extending through said apertures and through the socket is a pin 15, having a squared central portion 16 for fitting snugly within the squared aperture 17 of a spindle sleeve 18 to lock the pin to the sleeve, and having circular sections 19—19' at opposite ends of the squared central part, of a diameter to fit snugly within the round apertures 12—13 in the ball and turn freely therein.

The lower bearing member 19' is of such diameter that the lower end of the squared central part 16 projects thereover as a shelf so that the latter may rest on the bottom of the ball socket to support the pin after the latter has passed through the spindle sleeve. The ends of the pin are squared to fit within the squared sockets 20—21 of the housing rings 22—23, presently described, which are adapted for turning on the ball under influence of a steering mechanism; one of the rings being provided with a knuckle 25 comprising an arm 26 that is connected with the connecting rod 27, and the said knuckle on the ring at one side of the vehicle being also provided with an arm 26' which may be connected with a steering rod 28.

A driving shaft 29 is contained within the axle 2 and projects from the end thereof through a diaphragm 6' which limits the projection of the collar onto the axle, into a chamber 9' that opens into the gearing socket 9. Fixed on the shaft 29, within the housing socket is a bevel gear wheel 30, having a collar 30' projected into the bearing chamber 9' and provided therein with thrust bearings 30''. The wheel 30 meshes with a bevel gear wheel 31 that is revolubly mounted on the lower end of the spindle sleeve 18 and is supported by thrust bearings 31' at the bottom of the socket 9.

The spindle sleeve 18 carries a spindle 33, which projects into the hub 34 of a ground wheel 3 having a web 38 provided with an outwardly bowed central portion 39 that forms a socket for the housing ball 8; the hub 34 being extended into the ball socket to bear against the spindle and form a support for the gear wheel 32, which is fixed thereto and to the web socket by bolts 46. The spindle turns in a thrust bearing 32' in the inner portion of the wheel hub and in a bearing 32'' in the outer portion thereof, the wheel being held to the spindle by a nut 36, which bears against the outer bearing. The spindle sleeve has an anti-friction bearing 41 in the top of the housing which cooperates with the bearing for the lower wheel 31 to eliminate friction as much as possible.

As the shaft 29 is inserted longitudinally through the hollow axle to fit in the differential gearing, I provide the same with a keyway 43 so that it may receive a suitable tool when the shaft is to be withdrawn; it being apparent that the shaft and its gear wheel are held in place, when the parts are fully assembled, by locking the spindle sleeve to the housing 5; the housings 5 on opposite ends of the axle being connected by a rod 44 which may be bolted to the ears 45 on the housing.

The knuckle ring member 22 is applied to the housing before the latter is applied to the axle, but the ring member 23 is fixed to the wheel web by the bevel gear 32 and bolts 46, so that when the wheel is in place the ring 22 may be drawn to the position wherein the flanges 22'' and 23'' meet and may be bolted together to hold the wheel to the housing, while permitting free pivotal movement of the rings on the ball to provide for steering the wheel.

In order to form a close joint between the ring 23, the bowed portion of the wheel web, and the gear wheel 32, that will serve to retain lubricant therein, I provide the ring 23 with a felt, or like washer 48 that is adapted to bear against the wheel web, and the gear wheel with a similar washer 49 that bears against the inner face of the ring; the bearing being sufficiently loose to permit free movement of the wheel without permitting the escape of lubricant.

In assembling the device the housings are first mounted on the ends of the axle and the shaft 29, having the gear wheel 36 fixed thereon, is projected through the housing and axle to the differential gearing. The wheel, with the spindle sleeve and the horizontal gear wheel 31 thereon, is then slipped to place, with the sleeve projected into the socket; the key pin 15 is then dropped through the housing apertures and sleeve to hold the sleeve and its gear wheel in place; the parts of the pin being so arranged that the squared central portion will lock in the squared channel of the sleeve, while the circular bearing portions are located in the bearing apertures in the housing. The outer ring 23 is moved against the curved face of the housing when the wheel is positioned, so that its socket member may move into the squared end of the sleeve pin, and the other ring part 22, which has been applied to the housing before the latter has been placed on the axle, is then drawn to position so that its lip 21' overlies the top of the sleeve pin and the two ring members are bolted together to lock the ring to the ends of the sleeve pin. The connecting and lever rods are then attached to the ring arms. With the parts so arranged, when the vehicle is used each of the wheels is driven independently from the motor, through the beveled gearing in its respective housing and each of the wheels may be steered by manipulation of the common steering mechanism; the wheels moving in unison, however, by reason of their connecting rods and their connection with the steering lever, and the differential gear acting in the ordinary manner to allow one of the wheels to travel faster than the other when necessary.

Having thus described my invention, what I claim as new therein, and desire to secure by Letters-Patent, is:—

1. The combination with a hollow axle, of a housing fixed on the axle and having a ball member provided with an outwardly opening socket, a pin revolubly mounted in the ball member at opposite sides of the socket and having key members within the socket and on its projecting ends, a split ring having socket members overlying the key portion of the pin and movably mounted on the ball portion of the housing, steering mechanism connected with said ring, a sleeve keyed to said pin and having a spindle projecting from the housing, a ground wheel mounted on the spindle and ring, a bevel gear wheel fixed to the ground wheel, a shaft projecting from said axle into the housing, a bevel gear wheel on said shaft, and an intermediate gear wheel revolubly mounted on the sleeve and meshing with the shaft and ground wheel gears.

2. The combination with a hollow axle, of a housing fixed on said axle and having a ball member provided with an outwardly opening socket, a shaft projecting from said axle into the housing, split ring members movably mounted on the ball portion of the housing and having attaching flanges and socket members, with one of the flanges having a lip overlying the socket member of the other ring, steering arms on the ring, a connecting rod attached to one of the arms, a steering lever attached to the other arm, a sleeve in said housing having a spindle projecting therefrom, a bevel gear wheel revolubly mounted on the sleeve, bevel gear wheels attached to the ground wheel and shaft respectively and meshing with the first named bevel gear wheel, and a pin keyed to the sleeve and to the said ring and revolubly mounted in the housing, substantially as set forth.

In testimony whereof I affix my signature.

THEODORE DITMARS.